(12) United States Patent
Sprague et al.

(10) Patent No.: US 7,716,560 B1
(45) Date of Patent: May 11, 2010

(54) PROTECTION SWITCH DECISION ARCHITECTURE

(75) Inventors: Edward E. Sprague, Woodside, CA (US); Marco E. Sosa, San Jose, CA (US); Daniel P. Murphy, Ben Lomond, CA (US); Christopher C. Liou, Cupertino, CA (US); Ting-Kuang Chiang, Saratoga, CA (US); Drew D. Perkins, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 982 days.

(21) Appl. No.: 11/479,047

(22) Filed: Jun. 30, 2006

Related U.S. Application Data (60) Provisional application No. 60/695,386, filed on Jun. 30, 2005.

(51) Int. Cl.
*H03M 13/00* (2006.01)

(52) U.S. Cl. .................................................. 714/776

(58) Field of Classification Search ................. 714/752, 714/776
See application file for complete search history.

(56) References Cited

U.S. PATENT DOCUMENTS

2001/0053225 A1* 12/2001 Ohira et al. .................. 380/239
2002/0126337 A1* 9/2002 Uematsu et al. ............. 359/110

* cited by examiner

*Primary Examiner*—Guy J Lamarre
(74) *Attorney, Agent, or Firm*—North Weber & Daugh LLP; Ross M. Carothers (57) ABSTRACT

The present invention provides a system, apparatus and method for accurately identifying optical or digital impairments on a span using FEC errors identified at an intermediary node. This information may be provided to an end node within a network to switch to a redundant path around the impaired optical path or span therein. In one embodiment of the invention, signal degradation is identified by analyzing FEC data within a FEC decoded signal at an intermediary node. An identification of signal degradation provides an indication of a potential failing span within an optical link, which may be provided in-band or out-of-band to a terminal node so that a signal may be switched around a failing path, or span therein, prior to an actual failure event.

25 Claims, 5 Drawing Sheets

PROTECTION SWITCH DECISION ARCHITECTURE

CROSS REFERENCE TO RELATED PATENT APPLICATIONS

This application claims priority to U.S. Provisional Application Ser. No. 60/695,386, entitled "Protection Switch Decision Architecture," filed Jun. 30, 2005, which application is incorporated herein by reference in its entirety.

BACKGROUND

A. Technical Field

The present invention relates generally to optical networking node architectures and configurations, and more particularly, to protection switching of FEC-encoded signals.

B. Background of the Invention

The importance of optical networking technology in today's society is well understood. Optical networks allow large amounts of information to be transmitted at high data rates across very long distances. In optical long-haul or metro-ring scenarios, multiple channels or wavelengths are multiplexed together and inserted into a fiber optic cable that spans a relatively long distance. The optical signal, comprising multiple wavelengths, propagates within the fiber optic cable until its destination is reached. This signal is demultiplexed and the individual wavelengths further processed at a destination node.

The reliability of networks is extremely important and network operators require that their networks operate with an extremely low failure rate. A network failure event may lead to a large amount of data being lost and may significantly impact the companies that rely on the network. These network failures may also cause financial losses to the network providers and require significant efforts to repair. In order to minimize the number of failure events, networks are built with layers of redundancy.

Networks generally provide redundant paths between network nodes to improve reliability. Data is switched between these paths in the events of failures, latency issues or other factors that may reduce the reliability of data be transmitted between the nodes. The management of traffic across these redundant paths may be performed using different techniques and in accordance with various protocols.

Figure 1:
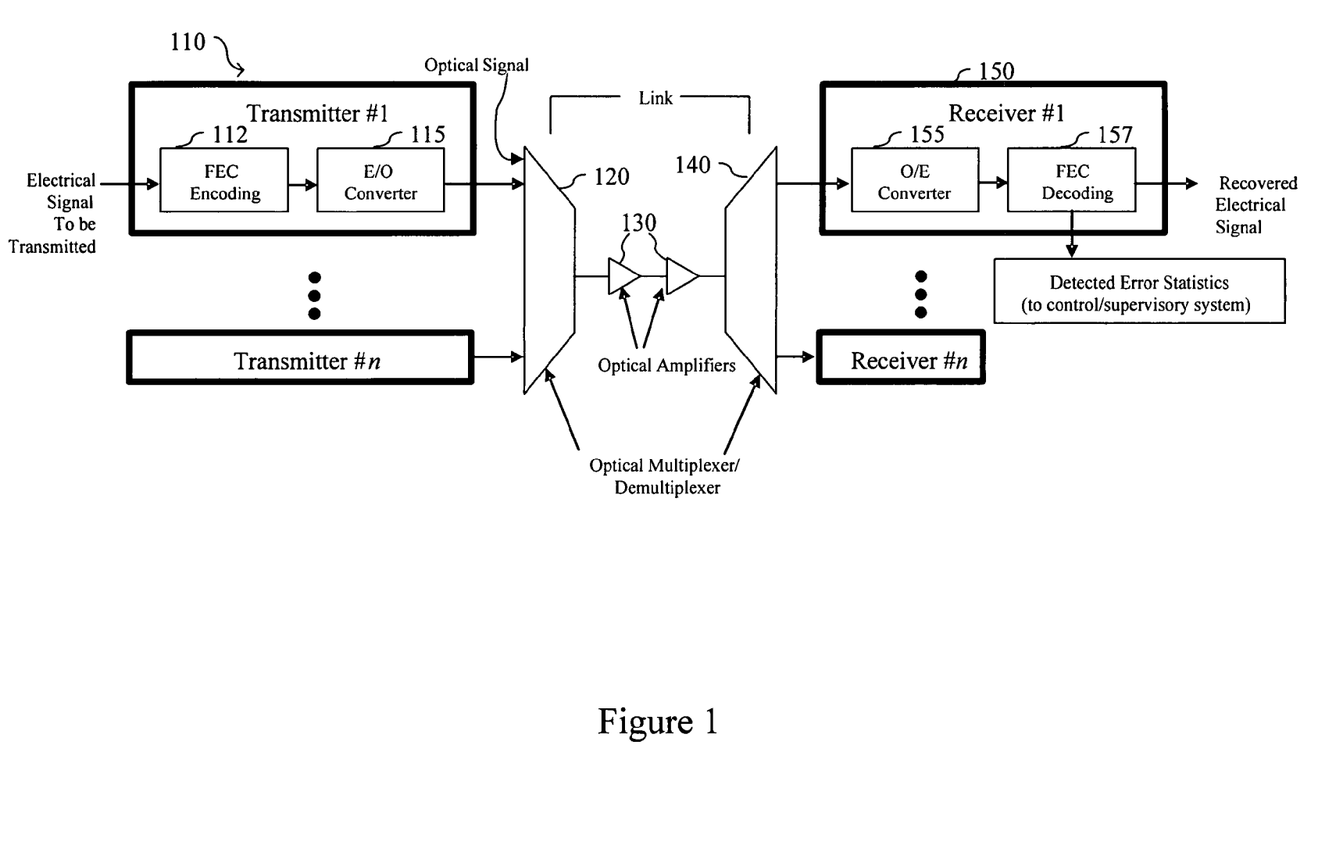
FIG. 1 illustrates an exemplary point-to-point network connection having intermediary optical amplifiers inserted within the optical span.

FIG. 1 illustrates an exemplary wave division multiplexing ("WDM") network link. The link includes a plurality of transmitters 110, each having a forward error correction ("FEC") encoder 112 and electrical-to-optical converter 115. A multiplexer 120 multiplexes the optical signals generated from the transmitters 110 into a WDM signal that is inserted into optical fiber. The link may also include various intermediary devices such as optical amplifiers 130 or regenerators (not shown) to amplify or otherwise repair the WDM signal as it propagates along the link. At a receiver node, the WDM signal is demultiplexed into wavelength components by a demultiplexer 140. These wavelengths are sent to a plurality of receivers 150, each having an optical-to-electrical converter 155 and FEC decoder 157.

WDM and other metropolitan, regional and long haul fiber optic transmission systems typically utilize forward error correction ("FEC") encoding and decoding to correct single or multiple bit errors in a transmitted bitstream. The encoding and decoding process is typically limited to one transmitter/receiver link, defined as being the signal path between the electrical-optical converter 115 of the transmitter 110 and the optical-electrical converter 155 of the receiver 150. This FEC encoding compensates for errors generated within the optical signal and also provides an indication of the health of the link or signal path. However, as will be discussed in more detail below, FEC encoding may also mask indications of a degrading link, optical path or span therein.

Figure 2:
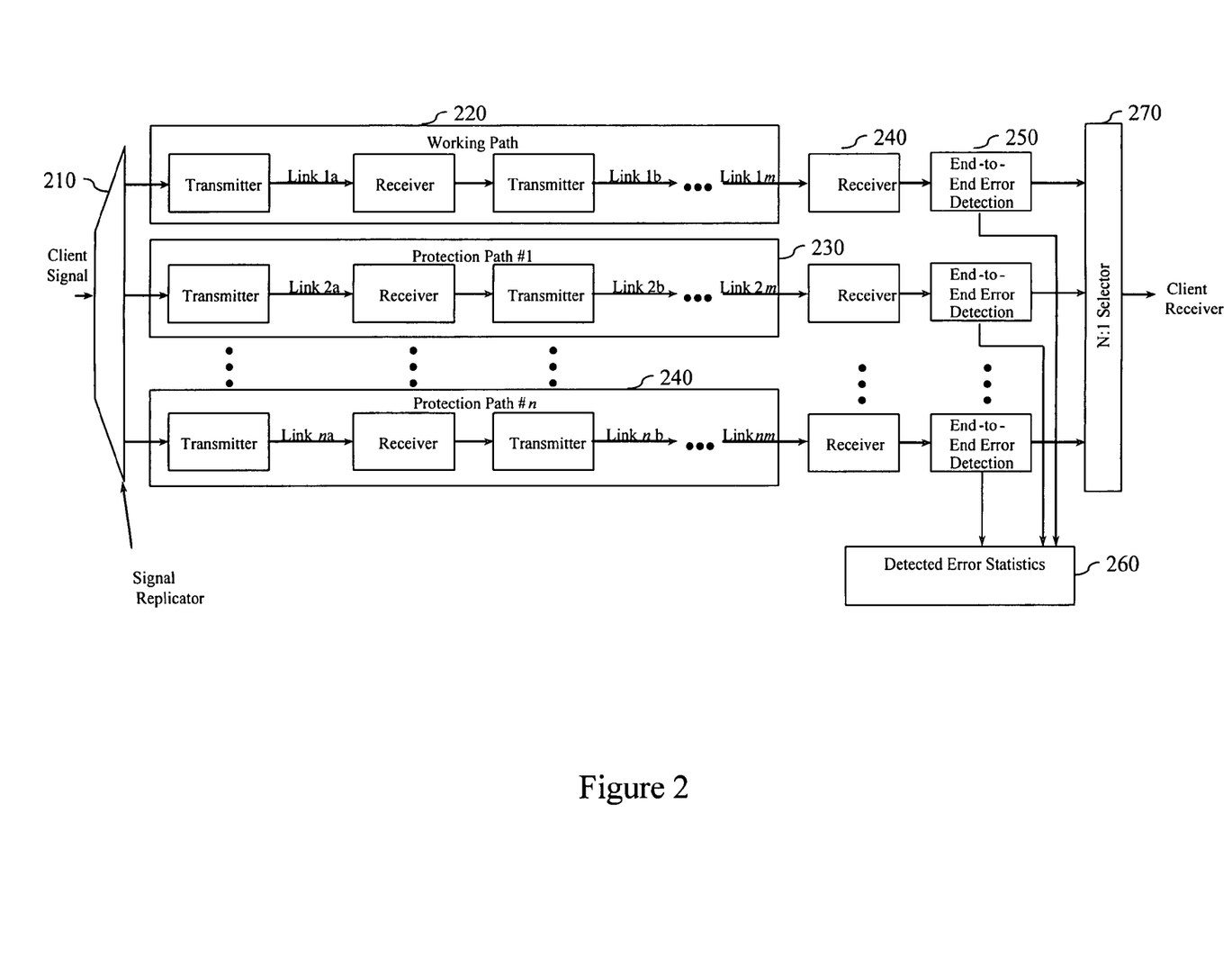
FIG. 2 illustrates an exemplary protected network in which multiple redundant paths are provided in order to provide high reliability against fiber and equipment failures.

FIG. 2 illustrates an exemplary protected network in which multiple redundant paths are provided in order to provide high reliability against fiber and equipment failures. A client signal is provided to a multiplexer 210 that is coupled to a working path 220 and a plurality of protection paths including a first protection path 230 up to an $N^{th}$ protection path 240. Each path, including the working path and protection paths 1 through n, can include one or more concatenated transmitter/receiver links (link a through span m) and may include additional optical or electrical switches (not shown).

The client signal is "bridged" or replicated to the multiple independent paths, one of such paths being selected to be delivered to the client receiver. Each of the paths terminates at a receiver 240 that includes an end-to-end error detection module 250. A selector 270 selects a signal from one of the paths and transmits the signal to a client receiver. A detected error statistics memory 260 may also be provided that stores information about identified errors on each of the signal paths.

In selecting a desired signal path from multiple paths of transmissions of the same client signal, the decision of selecting the optimum client signal path is a determination based upon schemes that select the signal path according to various factors. A first factor that may be used is the absence of a recognizable signal generally indicated by a loss of optical power or a loss of frame condition, which may be detected at the end terminal receiver of the signal selector 270. A second factor is recognizable signal with an unacceptable bit error rate at the end terminal receiver of the signal selector 270.

Figure 3:
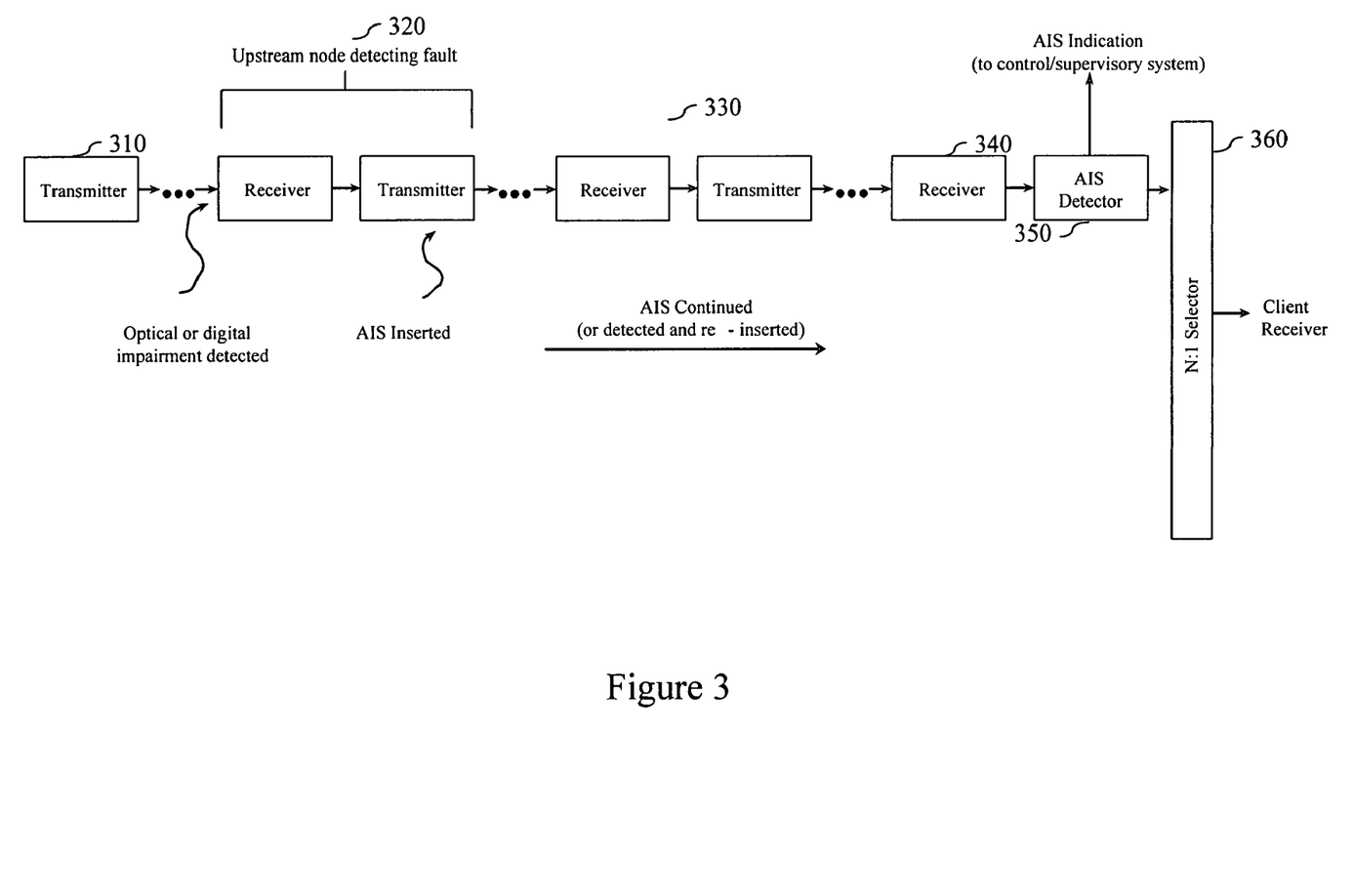
FIG. 3 illustrates an exemplary AIS scenario in which a signal is transmitted by a transmitter on a link comprising multiple intermediary nodes that may generate an AIS.

A third factor is the reception of an alarm indication signal ("AIS") which is an indication generated by an upstream node and transmitted to the far end receive node. FIG. 3 illustrates an exemplary AIS scenario in which a signal is transmitted by a transmitter 310 on a link comprising multiple intermediary nodes 320, 330, 340. An end receiver 340 receives the client signal and an AIS detector 350 identifies the presence of the AIS. A selector 360 selects a particular client signal and forwards it onto a client receiver.

Referring to FIG. 3, the upstream intermediary node 320 detects an optical or digital impairment in the link and generates an AIS. The MS is inserted into the client signal and a transmitter transmits the AIS and client signal onto the link. The AIS may be inserted within the client signal or may have a dedicated channel in which MS and other control signals are communicated. After the AIS detector 350 receives the inserted MS, it may respond in a number of ways including switching the signal onto a redundant path.

A problem with this selection schemes is that, due to the nature of a FEC encoded system, the selection of a new desired signal path from among multiple signal paths often results in the transmission of a substantial number of errors to the client receiver before the selection can be transpired. More specifically, systems with high FEC gain will allow the client signal to be received essentially without errors even though the condition of the link over which the client signal is transported has a marginal condition in one or more of the concatenated spans that make up the signal path. By marginal condition, it is meant that at least one span has a marginal capacity to successfully transport the client signal but since the signal is FEC encoded, accurate recovery of the signal is realizable.

For example, the pre-FEC error rate may be marginally acceptable and then a subsequent change in the polarization mode dispersion causes the pre-FEC error rate to move from the marginally acceptable point to a point just below an acceptable rate, which will result in a high post-FEC error rate and loss of signal integrity. The far end selector may be able to select at this point a different signal path for the client signal reception, but due to the latency of the error detector in the receiver and the selector, at least a portion of the degraded or corrupted client signal may be transmitted to the client before the switching to a better client signal path of the client signal can be successfully transpired.

SUMMARY OF THE INVENTION

The present invention provides a system, apparatus and method for accurately identifying optical or digital impairments on a link using FEC errors identified at an intermediary node. This information may be provided to an end node within a network to switch to a redundant path around the impaired optical path or span therein. In one embodiment of the invention, signal degradation is identified by analyzing FEC data within a FEC decoded signal at an intermediary node. An identification of signal degradation provides an indication of a potential failing span within an optical link, which may be provided in-band or out-of-band to a terminal node so that a signal may be switched around a failing path, or span therein, prior to an actual failure event.

Intermediary regenerating nodes are provided within an optical link resulting in a plurality of concatenated spans within the link, each separated by a regenerating node. The regenerating nodes independently FEC encode and decode the optical signal for each span. These FEC processes on the intermediary nodes allow for the identification of FEC errors on one or more spans and subsequent analysis of these errors.

In various embodiments of the invention, intermediary nodes (e.g., regenerators) are provided with integrated optics that convert data between the optical and electrical domains. These intermediary nodes also de-encapsulate FEC information from a received signal and process the information to check the integrity of the data being received. Various FEC algorithms may be employed on the intermediary nodes to identify and correct errors within the signal. In one embodiment of the invention, analyzed FEC error information is compared to a threshold in order to determine the status of a link, optical path, or span therein. This FEC error information is communicated to an end node, which may be done either in-band or out-of-band depending on the particular implementation. If the analyzed FEC information falls below the threshold, then a degrading span is assumed and a warning is transmitted to an end node so that the signal may be switched around the degrading link or span therein. As a result, degrading links are identified relatively early from FEC analysis and data may be diverted around a degrading link before the end client receives a substantial amount of corrupted data.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The present invention provides a system, apparatus and method for accurately identifying optical or digital impairments on a link using FEC errors identified at an intermediary node. This information may be provided to an end node within a network to switch to a redundant path around the impaired optical path or span therein. In one embodiment of the invention, signal degradation is identified by analyzing FEC data within a FEC decoded signal at an intermediary node. An identification of signal degradation provides an indication of a potential failing span within an optical link, which may be provided in-band or out-of-band to a terminal node so that a signal may be switched around a failing path, or span therein, prior to an actual failure event.

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

A. FEC Error Analysis Protection Architecture

Various embodiments of the present invention provide an improved protection switching architecture for an optical link having concatenated spans separated by intermediary nodes. This network protection architecture identifies FEC errors at the intermediary nodes in order to more accurately determine on which transmission path a client signal is to be transmitted. This identification may be done using various FEC algorithms that are known within the art. An analysis of these FEC errors further optimizes the path selection in a multi-path optical link and provides a more dynamic redundant path switching method.

Intermediary nodes, such as regeneration nodes, decode and process FEC information from a signal that is being transmitted on a path. These intermediary nodes contain integrated optics that allow cost-effective conversion of signals between the electrical and optical domains. Examples of these integrated optics, and associated architectures and functions, are described in U.S. Published patent application Ser. No. 10/267,331, entitled "Transmitter Photonic Integrated Circuits (TXPIC) and Optical Transport Networks Employing TXPICS," filed Oct. 8, 2002; U.S. Published patent application Ser. No. 10/267,304, entitled "Optical Signal Receiver Photonic Integrated Circuit (RXPIC), an Associated Optical Signal Transmitter Photonic Integrated Circuit (TXPIC) and an Optical Network Transmission System Utilizing these Circuits," filed Oct. 8, 2002; and U.S. Published patent application Ser. No. 10/267,212, entitled "Digital Optical Network Architecture," filed Oct. 8, 2002; all of which are incorporated by reference in their entirety. Because of the characteristics of these intermediary nodes employing integrated optics, FEC encoding and decoding may be cost-effectively included within the nodes.

The FEC supported protection switching architecture can be utilized within a number of different architectures including ring and linear network architectures. FEC error information, such as the presence of a high number of errors detected by the FEC processes, is transmitted from the intermediary nodes to a far end receiver node. At the far end receiver node, a determination is made as to the "health" status of the several signal paths from which a selection is made by the end terminal selector. In various embodiments of the invention, control logic at a receiver node is provided that selects the path of a client signal in response to information provided by an analysis of the FEC errors at the plurality of intermediary nodes within the multiple signal paths. The control circuitry is able to identify a preferred path within the multiple paths and cause that a client signal be transmitted over the preferred path. This process may occur in response to a degrading link in which the client signal is redirected around the degrading link prior to a significant amount of corruptible data received by the client.

It is not necessary that all the concatenated spans comprising the transmission path support FEC encoding/decoding as long as the FEC-encoded client signal at the point of origin is transmitted through the link and is capable of being decoded at the end terminal or end node. In particular, if several FEC encoded versions of the client signal are transmitted along different transmission paths to a same end terminal receiver node, a signal selector at the receiver node will select the transmitted client signal on a signal transmission path that has the least number of FEC decoded errors in the FEC encoded client signal.

By their nature, FEC decoders allow a high error count to exist on a given optical link to permit the correction essentially of all client signal errors so that FEC-encoded optical paths take into consideration that a normally pre-FEC encoded client signal can contain a significant amount of signal error. FEC decoders are able to provide, in addition to client signal error correction, information via performance monitoring, such as a bit error rate measurement, which information is employed by the client for use in the management of their network system.

Information derived from a FEC decoder, including bit error rates, is also employed to operate control logic to the receiver signal path selector in order to select an optimum signal path based upon the this information. In one embodiment, the selector control logic processes the FEC information to determine the pre-FEC error rate on one or more paths and is directed to switch to the redundant signal path having what is termed the lowest pre-FEC decoded error.

Figure 4:
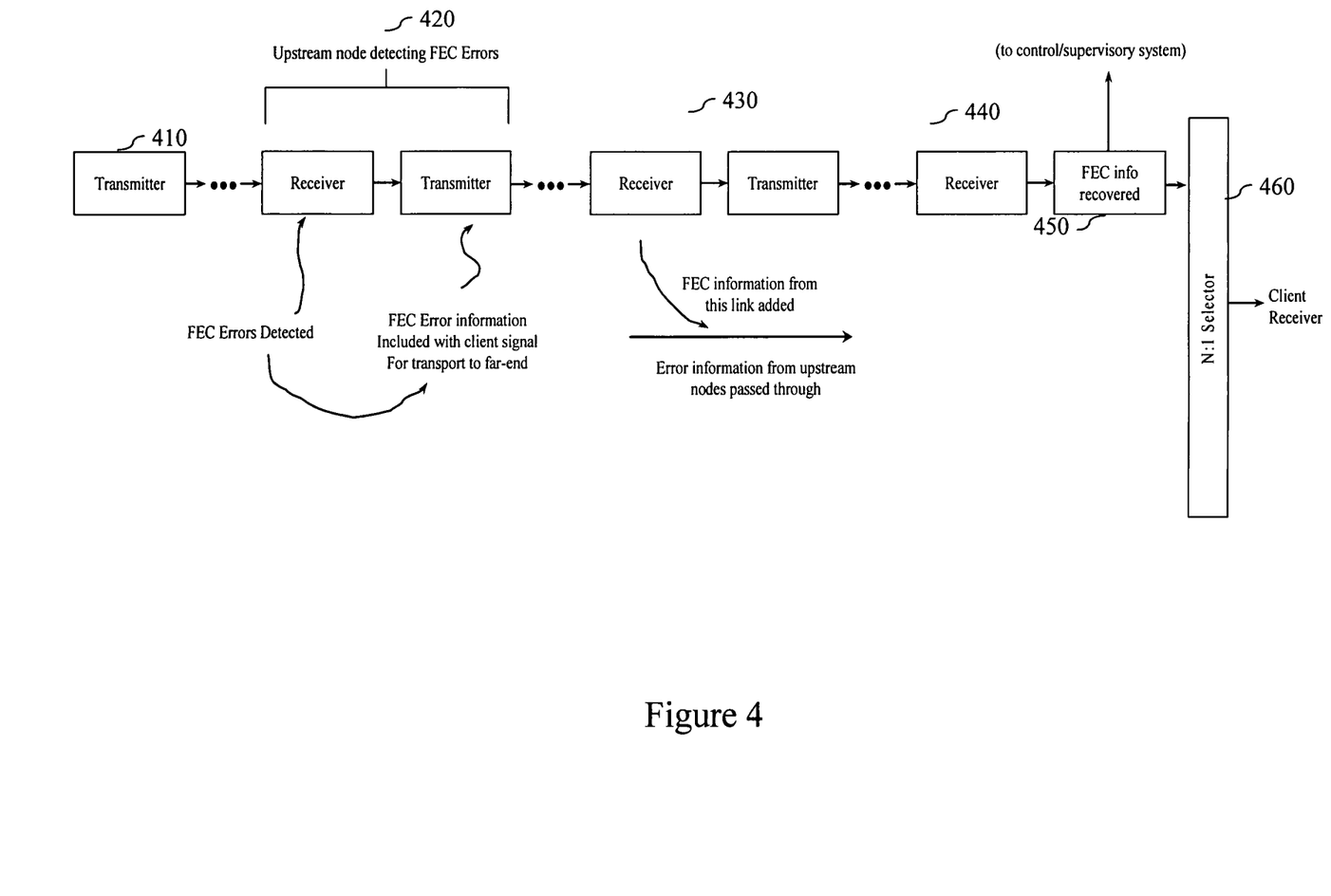
FIG. 4 illustrates a network protection switch architecture according to various embodiments of the invention.
Figure 5:
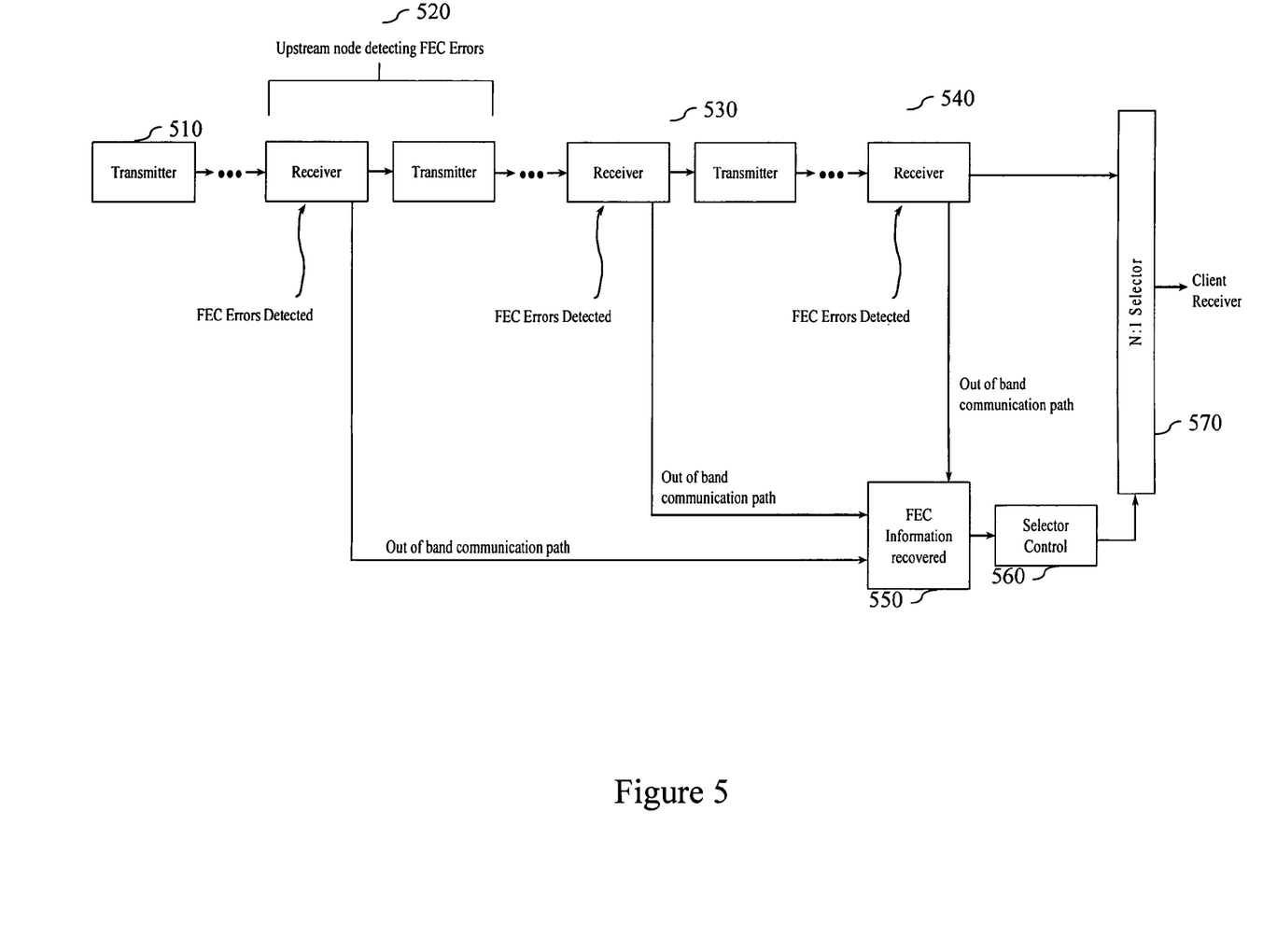
FIG. 5 illustrates another network protection switch architecture according to various embodiments of the invention.

In various embodiments of the invention, a pre-FEC decoded error is determined, for example, at an upstream intermediary node in the optical link path that forwards this error information to a terminal end node receiver. This error information may be provided to terminal end node receiver using either in-band or out-of-band communication. FIG. 4 illustrates an exemplary architecture in which in-band signaling is used and FIG. 5 illustrates an exemplary architecture in which out-of-band signaling is used.

B. In-Band and Out-of-Band Signaling

Referring to FIG. 4, a transmitter 410 transmits a FEC encoded signal onto an optical link having a plurality of concatenated spans separated by regenerator nodes 420, 430. These regenerator nodes 420, 430 decode and code FEC in the signal during the regeneration process. The signal is received by a receiver 440 and decoded so that FEC information may be recovered and analyzed by a FEC module 450. At least partially based on this analyzed FEC information, a selector 460 selects a client signal path that is sent to a client receiver.

In this example, FEC errors are detected at a first upstream regeneration node 420. These FEC errors are inserted within the client signal in the electrical domain. The signal is FEC encoded and converted into the optical domain, and transmitted onto the optical link. A second upstream regeneration node 430 detects further FEC errors and inserts these errors in-band within the client signal. This signal from the second regeneration node 430 is transmitted onto the link and eventually received by the receiver 440 where the FEC module 450 analyzes the in-band FEC error information from both intermediary nodes 420, 430. A particular advantage of in-band signaling is the relatively low latency of the signaling method.

In various embodiments of the invention, this FEC error information may be transmitted in-band via link messaging, such as a supervisory control signal or information placed in the client signal header, as to the upstream bit error rate level encountered in a particular redundant client signal path. A determination can then be made at the terminal end node receiver 440 as to which signal path provides the least amount of actual error to the client signal based upon the actual bit error rate. The bit error rates may be continuously compared to a set of thresholds and a detected state above a predetermined threshold is indicative of a redundant signal path that should not be selected. Conversely, a detected state below the predetermined threshold is indicative of a redundant signal path that could be selected.

The threshold may be selected to be significantly above the point where post-FEC errors would be generated such that a momentary degradation, due to polarization mode dispersion for example, would not result in a substantial loss of signal integrity. Rather, the end node selector 460 would be able to switch to a more desirable signal path in response to the momentary degradation without experiencing post-FEC errors.

FIG. 5 illustrates an out-of-band communication scenario in which FEC error information is provided from an intermediary node to an end node receiver. A transmitter 510 transmits a FEC encoded signal onto an optical link having a plurality of concatenated spans separated by regenerator nodes 520, 530. These regenerator nodes 520, 530 decode and code FEC information in the signal during the regeneration process. The signal is received by a receiver 540 and decoded so that FEC information may be recovered and analyzed by a FEC module 550. At least partially based on this analyzed FEC information, a selector 570 selects a client signal path in relation to a selector control 560, which is sent to a client receiver.

In various embodiments of the invention, out-of-band signaling is employed to communicate FEC error information from a regeneration node 520, 530 to the FEC module 550. In this particular example, a first out-of-band communication path is provided between the first upstream regeneration node 520 and the FEC module 550. A second out-of-band communication path is provided between the second upstream regeneration node 530 and the FEC module 550. Based on FEC error information, the selector control 560 controls the switching on the selector 570 in order to select an appropriate path for a client signal.

The link messages resulting from FEC errors detected in an upstream intermediary node can be an out-of-band error count signaling employing a supervisory signal channel, such as an optical supervisory channel, to convey the amount of detected error in the client signal in an upstream point of transmission of the client signal. In various embodiments of the invention, the link messaging is transported through intervening link nodes onto the end node.

In other aspects of this invention, the FEC bit error rate may be qualified according to various states. For example, a Signal Fail state or a Signal Degrade state may be defined to better quantify or characterize the health of a particular link relative to detected FEC errors. These states may then be more easily processed in order to determine an appropriate path to communicate a client signal. For example, in one embodiment of the invention, OR logic circuitry may be employed along a signal path in order to identify whether that particular path, and associated spans therein, should be used to communicate a client signal. In particular, the state of each span within the path is ORed together to identify if all of the spans within the path are sufficiently healthy. The terminal end node will detect the Signal Fail or Signal Degrade signal state respectively indicating that at least one span in the signal path has failed or is of unacceptable degradation so that the selector should therefore select another signal path for receipt of the client signal.

While this invention has been discussed in terms of a network protection scheme in which the client traffic is continuously sent along multiple paths, each path including one or more concatenated spans, and selected at the far end, it should be apparent to those skilled in the art that the present invention can be employed in network protection schemes where the relative health of multiple signal paths is continually monitored at any particular point, at multiple points, or at all points in a network. When a control function determines that a new signal path is preferable to the current path, the client signal can be redirected along the new path, the end node selector being directed to select the traffic from the new path.

Bidirectional line switched ring and linear 1:N automatic protection switching are examples of protection schemes where the relative health of multiple signal paths is continually monitored at some point in the network. Various embodiments of this invention can also be employed in networks which include network elements containing multiplexing or switching functions to compose the client signal to be transmitted.

Additionally, this invention can be employed in a protection scheme where two or more transmitters are passively coupled and the combined signal is forwarded to the selector. The selector function is implemented by enabling the desired transmitter while disabling the remaining transmitter(s). Two transmitters passively coupled can be referred to as a "Y-cable" protection scheme.

It will be realized by those skilled in the art, that this invention has application also in bidirectional line switching in ring and linear networks.

The foregoing description of the invention has been described for purposes of clarity and understanding. It is not intended to limit the invention to the precise form disclosed. Various modifications may be possible within the scope and equivalence of the appended claims.

We claim:

1. A network protection switching system, comprising:
   a transmitter coupled to bridge a client signal onto a multi-path network and the client signal being encoded using forward error correction ("FEC");
   a plurality of signal paths, within the multi-path network, communicatively connecting the transmitter to a receiver that receives and decodes the FEC encoded signal;
   a first set of intermediary nodes, coupled within a first path in the plurality of signal paths, that define a first set of concatenated spans in the first path and identify a first set of FEC errors associated with first path;
   a second set of intermediary nodes, coupled within a second path in the plurality of signal paths, that define a second set of concatenated spans in the second path and identify a second set of FEC errors associated with the second path; and
   a selector, communicatively coupled to the first and second intermediary nodes, that receives information related to the first and second sets of FEC errors and defines a preferred path within the plurality of signal paths.

2. The system of claim 1 wherein the information related to the first and second set of FEC errors is communicated using in-band signaling to the receiver.

3. The system of claim 2 wherein the information related to the first and second sets of FEC errors is inserted within the overhead of the FEC encoded signal by the first and second intermediary nodes.

4. The system of claim 2 wherein the information related to the first and second sets of FEC errors is inserted into a supervisory control signal by the first and second intermediary nodes.

5. The system of claim 1 wherein the information related to the first and second set of FEC errors is communicated using out-of-band signaling to the receiver.

6. The system of claim 5 further comprising:
   a first out-of-band communication path, coupled to the first intermediary node and a selector control, that communicates the information related to the first set of FEC errors;
   a second out-of-band communication path, coupled to the second intermediary node and the selector control, that communicates the information related to the second set of FEC errors; and
   wherein the selector control controls the selector in a determination of the preferred path.

7. The system of claim 5 wherein out-of-band signaling includes a common out-of-band node that couples first and second out-of-band communication paths to the selector.

8. The system of claim 1 wherein the information related to the first set of FEC errors comprises a first FEC error count identified on the first intermediary node and the information related to the second set of FEC errors comprises a second FEC error count identified on the second intermediary node.

9. The system of claim 1 wherein the first intermediary node is a regeneration node.

10. The system of claim 9 wherein the regeneration node comprises integrated optics that convert the FEC signal between the electrical and optical domains.

11. An intermediary node that couples two concatenated links within a signal path, the intermediary node comprising:
- a first interface that receives a first optical signal from a first span within the signal path;
- a first integrated converter, coupled to the first interface, that converts the first optical signal to a first electrical signal;
- a FEC decoder, coupled to the first integrated converter, that decodes the first electrical signal according to a FEC decoding method;
- a FEC error identification module, coupled to the FEC decoder, that identifies a first set of FEC errors within the decoded first electrical signal;
- a FEC encoder, coupled to the FEC decoder, that generates and encodes a second electrical signal, associated with the first electrical signal, according to a FEC encoding method;
- a second integrated converter, coupled to the FEC encoder, that converts the encoded second electrical signal to a second optical signal;
- a second interface, coupled to the second integrated converter, that transmits the second optical signal to a second span within the signal path; and
- wherein information associated with the identified first set of FEC errors is provided to a receiver terminating the signal path so that a preferred signal path is selected.

12. The intermediary node of claim 11 wherein the information associated with the identified first set of FEC errors comprises a FEC error count.

13. The intermediary node of claim 11 wherein the information associated with the identified first set of FEC errors is provided to the receiver using in-band signaling.

14. The intermediary node of claim 11 wherein the information associated with the identified first set of FEC errors is provided to the receiver using out-of-band signaling.

15. The intermediary node of claim 14 further comprising a third interface, coupled to an out-of-band communication path, that transmits the information associated with the identified first set of FEC errors to a selector within the receiver.

16. The intermediary node of claim 11 wherein the intermediary node is a regeneration node.

17. The intermediary node of claim 11 wherein the first and second interfaces provide bi-directional signal transmission.

18. A method for selecting a preferred path within a plurality of signal paths between a transmit node and a receive node, the method comprising:
- identifying a first set of FEC errors at a first plurality of intermediary nodes located in a first path within the plurality of paths;
- identifying a second set of FEC errors at a second plurality of intermediary nodes located in a second path within the plurality of paths;
- providing information related to the first set of FEC errors and second set of FEC errors to a path selector; and
- selecting the preferred path based on an analysis of the information related to the first and second sets of FEC error.

19. The method of claim 18 wherein the information provided to the path selector is done using in-band signaling.

20. The method of claim 18 wherein the information provided to the path selector is done using out-of-band signaling.

21. The method of claim 18 wherein the first plurality of intermediary nodes comprises at least one regeneration node.

22. The method of claim 18 wherein the selection of the preferred path is performed using a plurality of link states derived from the information related to the first and second sets of FEC errors.

23. The method of claim 22 wherein the selection of the preferred path further comprises the step of ORing a first set of link states to determine a status of the first path and ORing a second set of link states to determine a status of the second path.

24. The method of claim 18 wherein the information related to the first and second sets of FEC errors comprises a first error count associated with a first link in the first path and a second error count associated with the a second link in the second path.

25. The method of claim 18 wherein the at least one intermediary node within the first plurality of intermediary nodes comprises integrated optics that convert signals between the optical and electrical domains.

* * * * *